July 10, 1962  G. E. NAPIER  3,043,558
INLINE CONTROL VALVE

Filed Nov. 12, 1958  3 Sheets-Sheet 1

INVENTOR
GORDON E. NAPIER

July 10, 1962

G. E. NAPIER 3,043,558

INLINE CONTROL VALVE

Filed Nov. 12, 1958

INVENTOR
GORDON E. NAPIER

July 10, 1962  G. E. NAPIER  3,043,558
INLINE CONTROL VALVE
Filed Nov. 12, 1958  3 Sheets-Sheet 3

INVENTOR
GORDON E. NAPIER

3,043,558
INLINE CONTROL VALVE
Gordon Edward Napier, Shore Road, Box 335,
Westerly, R.I.
Filed Nov. 12, 1958, Ser. No. 773,279
4 Claims. (Cl. 251—340)

This invention relates to valves in general and more particularly to an inline control valve of the globe type.

This invention has for one of its objects to provide an inline control valve of a simple and durable construction which can be easily and quickly adjusted or set to control the flow of fluid therethrough.

Another object of this invention is to provide an inline control valve having a pair of valve casing sections separated by a rotatable, nontranslatable center section, said center section being mounted for turning movement relative to said casing sections, and a translatable, nonrotatable valve threadably engaged to said center section whereby rotation of the center section causes the valve to move axially into or out of contact with the valve seat, thereby controlling the flow of fluid therethrough.

With these and other objects in view, as will appear hereinafter, I have devised a valve structure having certain novel features of construction, combination and arrangement of parts and portions, as will be hereinafter described in detail, and particularly set forth in the appended claims, reference being had to the accompanying drawings and to the characters of reference thereon, which form a part of this application, in which:

Figure 1:
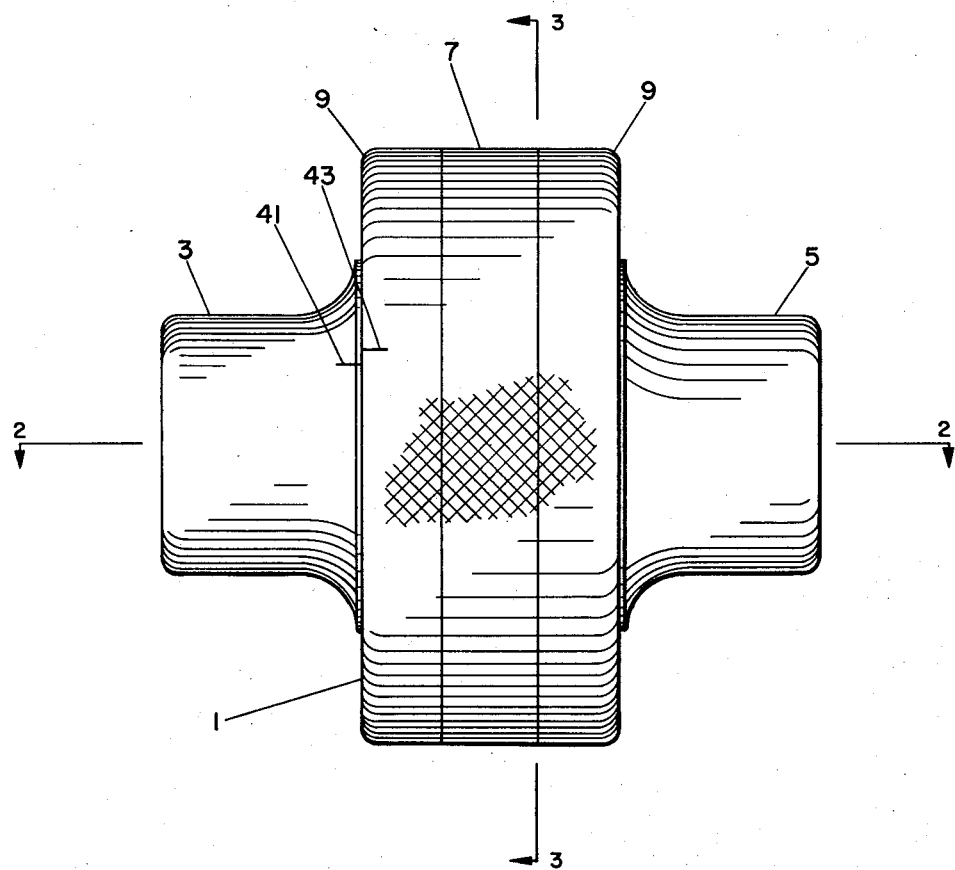
FIGURE 1 is a side elevation view of the inline control valve.

Referring to the drawings in detail, wherein similar reference characters designate corresponding parts throughout the several views, the inline control valve 1 comprises in combination a valve casing having a pair of independent longitudinally aligned sections 3 and 5, seals 6 and a center section comprising a center disk 7, two flanged collars 9, a plurality of pins or fasteners 11, and a valve 15 having a valve stem 15a threadably engaged to the center disk 7 of the center section. The end 15b of the valve stem 15a is also positioned within a guide means 17. This guide means 17 is attached to and located within one of the valve casing sections.

Figure 2:
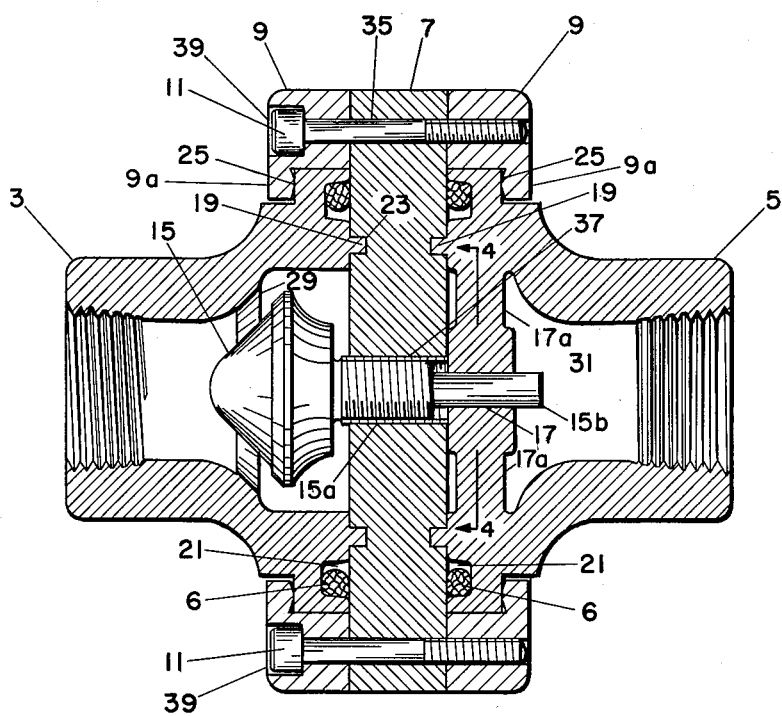
FIGURE 2 is a longitudinal plan view through the valve taken on line 2—2 of FIGURE 1.

Now with reference to FIGURE 2, the outer ends of the valve casing sections 3 and 5 are internally threaded for reception of pipe ends or pipe couplings (not shown). Each inner end of the valve casing sections 3 and 5 is preferably ground smooth to form a bearing surface with the adjacent side of the center disk 7 and has formed thereupon an annular lip 19 and an annular groove 21 to receive a seal 6. The annular lips 19 fit into corresponding annular grooves 23 formed on each side of the center disk 7. This lip and groove feature serves to hold the valve casing sections 3 and 5 and the center disk 7 in proper alignment. The valve casing sections 3 and 5 are also provided with an external annular stop shoulder 25. One of the valve casing sections has a valve seat 29 formed or machined therein. The other valve casing section has two or more radial webbed members 17a protruding into and meeting at the center of the cavity 31. These webbed members 17s form a guide means 17 through which passes the valve stem end 15b.

Figure 4:
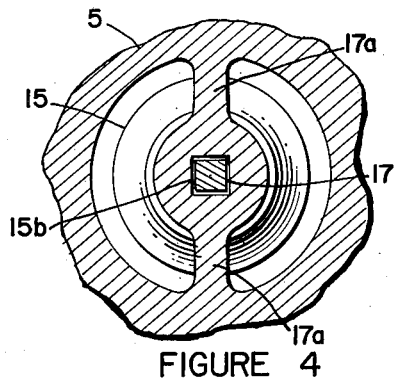
FIGURE 4 is a transverse sectional view through the valve taken on line 4—4 of FIGURE 2.

FIGURE 4 shows both the valve stem end 15b and the opening through the guide means 17 as being square, when viewed in cross-section, with the dimensions of the latter being slightly larger than those of the former. It is due to this feature that the guide means 17 allows translatory movement only of the valve stem 15a and the valve 15.

Figure 3:
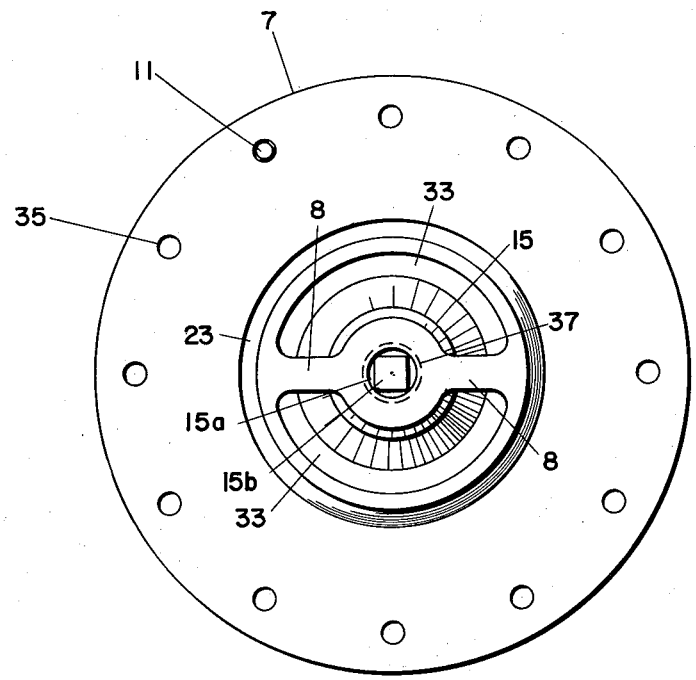
FIGURE 3 is an end elevation depicting the center disk and valve stem in the direction depicted by line 3—3 of FIGURE 1 with all of the parts to the right thereof removed.

Referring now to FIGURE 3, the center disk 7 is shown as a flat circular disk ground smooth on each side to form bearing surfaces with valve casing sections 3 and 5 and having two semi-circular openings 33 through which the fluid can flow and a plurality of openings 35 through which pass the pins or fasteners 11. The two semi-circular openings 33 are separated by two radial webbed members 8. These webbed members 8 meet at the disk's center and form a screw threaded opening 37 through which passes the threaded portion of the valve stem 15a. The openings 35 through which pass the pins or fasteners 11 are equally angularly disposed around the solid portion of the center disk 7. Formed within each face of the center disk 7 is an annular groove 23. Into this annular groove 23 is fitted the annular lip 19 of the adjacent valve casing section.

Referring again to FIGURE 2, the flanged collars 9 have a flange portion 9a and a plurality of openings 39 through which pass the pins or fasteners 11. That part of the flange portion which is in contact with the valve casing section's annular stop shoulder 25 is shown as being frustum-shaped, when viewed in cross-section, but it may be otherwise shaped to present the minimum contact area to the annular stop shoulder 25, or, for example, to ride against a thrust bearing. The surfaces of the center section and casing sections 3 and 5, between which relative movement will occur when the setting of the valve is being changed, may be specially treated, such as Teflon coated, to decrease the coefficient of friction. The openings 39 are angularly disposed around the flanged collars 9 and coincide in position and number to the openings 35 formed within the center disk 7.

The pitch of the threads formed upon the valve stem 15a and at the threaded opening 37 within the center disk 7 is preferably selected to permit the valve to fully open or fully close with slightly less than one complete revolution of the center disk 7. By scribing a line 41 upon one of the stationary valve casing sections and a corresponding line 43 on the adjacent flange dcollar 9 and also marking (not shown) either of said parts to show the relative amount of rotation which has occurred between said parts, the setting of the valve can at all times be determined. It goes without saying that there are other methods of determining the valve setting even when the thread pitch used in the opening 37 and on the valve stem 15a allows more than one revolution of the center disk 7 for fully opening or fully closing the valve.

Assembly of the control valve 1 is accomplished in the following manner. First, the seals 6 are inserted in the valve casing section's annular groove 21. Next, the valve stem 15a and the center disk 7 are threaded together in the fully opened setting. Then the combined unit, valve 15 and valve stem 15a and the center disk 7, is positioned between the two valve casing sections 3 and 5. A flanged collar 9 is then mounted on each valve casing section and brought into abutting relationship with the center disk 7. The relationship between the scribe lines 41 and 43 should correspond to the relationship between the center disk 7 and the valve 15 and valve stem 15a. Finally, the pins or fasteners 11 are inserted in the openings 39 and 35 of the flanged collars 9 and the center disk 7, respectively. The inline control valve 1 is now completely assembled and ready for installation in the fluid line.

Opening and closing or adjusting the valve setting is accomplished by rotating the center section. Remembering that the valve stem 15a is precluded from moving in a rotary fashion due to the construction of the valve stem end 15b and the opening through the guide means 17 in which said valve stem end 15b is positioned, it is readily apparent that rotation of the center disk 7 and, accordingly, the flanged collars 9 which are fastened to said center disk 7 by the pins or fasteners 11 will cause the valve 15 and the valve stem 15a to move axially within the inline control valve 1 and thereby control the amount of fluid flowing therethrough.

The torque required to operate the control valve depends upon several factors, namely the operating internal fluid pressure, the pressure with which the flanged collars 9 are held against the stop shoulders 25 of the valve casing sections 3 and 5, the coefficient of friction of the seal material and the finishes of the surfaces between which relative movement will occur. That part of the operating torque which is contributed by the first two items is governed by the internal fluid pressure. However, that part of the operating torque which is contributed by the last two mentioned items can be decreased by using a seal material having a low coefficient of friction and by using a relatively high degree of finish and a film lubricant on the surfaces having relative movement. Controlling the amount of operating torque by controlling the degree of finish on certain areas and by taking advantage of the low coefficient of friction characteristic of several seal materials is a well known practice in the art and therefore no further discussion thereof is necessary.

Having thus described a specific inline control valve as one embodiment of the present invention, it is desired to be understood that this form is selected to facilitate in the disclosure of the invention rather than to limit the number of forms this invention may assume, and it is to be understood that various adaptations, alterations, and modifications may be applied to the specific form shown to meet the requirements of practice, without in any manner departing from the spirit or scope of the present invention except as limited by the appending claims.

I claim:

1. An inline control valve comprising in combination a two-piece casing adapted to be placed in a fluid line, one of said casing sections having a valve seat surrounding an axial port formed therein and the other said casing section having a guide member located therein and attached thereto, and a center section comprising a center disk positioned between said casing sections and mounted for turning movement relative thereto, said center disk and each of said casing sections having abutting radial surfaces defining annular grooves, packing means received in each of said grooves, said center disk having an opening through which fluid may pass, a valve head cooperating with said seat having a valve stem threadably engaged to said center disk and axially slidably positioned in said guide member radially inwardly of said opening, said valve stem and guide member having cooperating cross sections such that all rotary motion of said valve head and said valve stem is prohibited, and means for aligning said center disk and casing sections and for holding the inline control valve together.

2. An inline control valve comprising in combination a two-piece casing adapted to be placed in a fluid line, one of said casing sections having a valve seat formed therein and the other said casing section having a guide member located therein and attached thereto, a pair of seals, each said seal being located in an annular groove formed on the inner face of each said casing section, means for ascertaining the valve setting at all times, and a center section comprising a center disk, said center disk having one or more openings through which fluid may pass and an annular groove formed on each face thereof, each of said annular grooves receiving an annular lip formed on the adjacent end of each said casing section for alignment of said casing section and said center disk, a valve having a stem threadably engaged to said center disk and positioned in said guide member such that all rotary motion of said valve and said valve stem is prohibited, and means for holding the inline control valve together, said means comprising a pair of flanged collars and a plurality of pins, each pin being positioned in one of a plurality of openings equally angularly disposed within said flanged collars and said center disk thereby holding said flanged collars and said center disk in fixed relation to each other as well as holding said inline control valve together.

3. An inline control valve comprising in combination a two-piece casing adapted to be placed in a fluid line, one of said casing sections having a valve seat formed therein and the other said casing section having a guide member located therein and attached thereto, a pair of seals, each said seal being located in an annular groove formed on the inner face of each said casing section, and a center section comprising a center disk, said center disk having an opening through which fluid may pass and an annular groove formed on each face thereof, each of said annular grooves receiving an annular lip formed on the adjacent end of each said casing section for alignment of said casing section and said center disk, a valve having a stem threadably engaged to said center disk and positioned in said guide member such that all rotary motion of said valve and said valve stem is prohibited, and means for holding the inline control valve together, said means comprising a pair of flanged collars and a plurality of pins.

4. An inline control valve comprising in combination a casing having a plurality of sections adapted to be placed in a fluid line, one of said casing sections having a valve seat surrounding an axial port formed therein and the other said casing section having a guide member located therein and attached thereto, a center section comprising a center disk, said center disk and casing sections having proximate radial surfaces defining annular grooves, packing members received in said grooves, said center disk having an opening through which fluid may pass, a valve head having a stem threadably engaged to said center disk radially inwardly of said opening and positioned in said guide member such that all rotary motion of said valve head and said valve stem is prohibited, and means for aligning said center disk and casing sections and for holding the inline control valve together.

References Cited in the file of this patent

UNITED STATES PATENTS

| 542,709 | Linke | July 16, 1895 |
| 633,069 | Busha | Sept. 12, 1899 |
| 903,451 | Clark | Nov. 10, 1908 |
| 1,759,060 | Moore | May 20, 1930 |
| 2,016,997 | Hartke | Oct. 8, 1935 |

FOREIGN PATENTS

| 346,753 | Germany | of 1922 |
| 589,994 | Germany | of 1933 |
| 655,024 | Germany | of 1938 |